United States Patent
Ghosh et al.

(10) Patent No.: US 7,418,151 B2
(45) Date of Patent: *Aug. 26, 2008

(54) SYSTEMS AND METHODS FOR OPTIMIZED REGION GROWING ALGORITHM FOR SCALE SPACE ANALYSIS

(75) Inventors: Pinaki Ghosh, Bangalore (IN); Ananthakrishna Madhyastha, Bangalore (IN); Preethish M. Kumar, Kasaragod (IN); Ramesh Venkatesan, Bangalore (IN)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/774,384

(22) Filed: Jul. 6, 2007

(65) Prior Publication Data
US 2008/0013852 A1 Jan. 17, 2008

Related U.S. Application Data

(63) Continuation of application No. 10/640,744, filed on Aug. 14, 2003, now Pat. No. 7,266,249.

(60) Provisional application No. 60/472,802, filed on May 22, 2003.

(51) Int. Cl.
*G06K 9/40* (2006.01)
*G06K 9/00* (2006.01)

(52) U.S. Cl. ............... 382/261; 382/132; 382/266

(58) Field of Classification Search ........... 382/128, 382/132, 254, 260, 261, 266, 274, 275
See application file for complete search history.

(56) References Cited

U.S. PATENT DOCUMENTS

| | | | |
|---|---|---|---|
| 6,690,816 B2 * | 2/2004 | Aylward et al. | 382/128 |
| 6,847,737 B1 * | 1/2005 | Kouri et al. | 382/260 |
| 6,937,776 B2 * | 8/2005 | Li et al. | 382/260 |
| 7,024,027 B1 * | 4/2006 | Suri et al. | 382/130 |

OTHER PUBLICATIONS

Frangi et al. "Multiscale Vessel Enhancement Filtering", Medical Image Computing and Computer-Assisted Interventation—MICCAI'98, vol. 1496, year: 1998, pp. 130-137.*
Sato et al. "Three-Dimensional Multi-Scale Line Filter for Segmentation and Visualization of Curvilinear Structures in Medical Images", MEdical Image Analysis (1998) vol. 2, No. 2, pp. 143-168.*

* cited by examiner

*Primary Examiner*—Colin LaRose
(74) *Attorney, Agent, or Firm*—McAndrews, Held & Malloy, Ltd.; Peter J. Vogel; Michael A. Dellapenna

(57) ABSTRACT

The present invention provides a system, method and computer program product for improving quality of images. The pixels of the input image are used to generate two lists of pixels based on two different scale space values. Thereafter, the two pixels lists are processed to obtain an output image with improved quality.

20 Claims, 4 Drawing Sheets

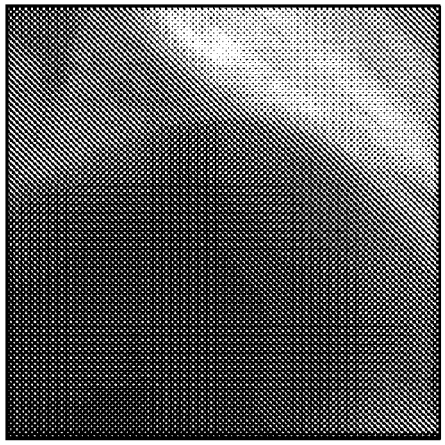
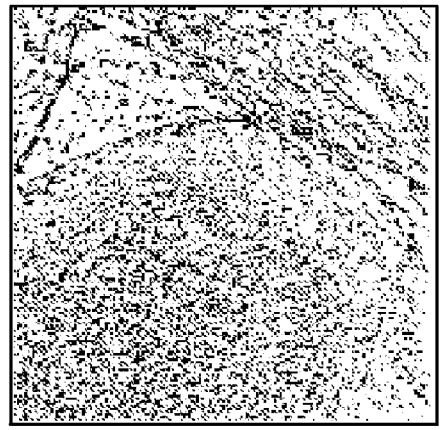
FIG. 3A            FIG. 3B
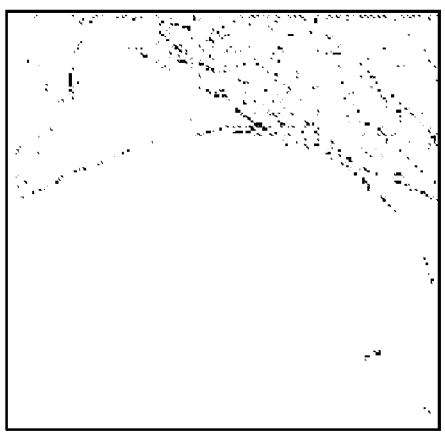
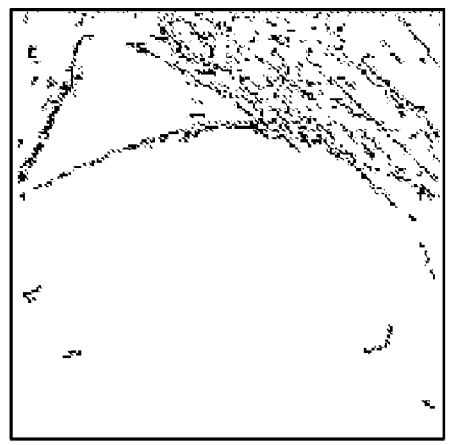
FIG. 3C            FIG. 3D

SYSTEMS AND METHODS FOR OPTIMIZED REGION GROWING ALGORITHM FOR SCALE SPACE ANALYSIS

RELATED APPLICATIONS

This application is a continuation of U.S. application Ser. No. 10/640,744, filed Aug. 14, 2003, entitled "Optimized Region Growing Algorithm for Scale Space Analysis", which is related to, and claims the benefit of, U.S. Provisional Application Ser. No. 60/472,802 which was filed May 22, 2003. The foregoing applications are herein incorporated by reference in their entirety.

BACKGROUND OF THE INVENTION

The present invention relates to the field of image processing. More specifically, the invention relates to a method and apparatus for improving the signal-to-noise ratio of an image during image processing.

Conventional treatment of vascular diseases is done by open surgery procedures. In open surgical procedures, the diseased area is exposed and then operated upon. This leads to patient discomfort. A rapidly emerging alternative to open surgery is endovascular interventional procedure. Endovascular interventional procedure is preferred to the conventional open surgery procedure because it is minimally invasive. Further, the duration of the patient's stay in intensive care is shorter, the blood loss is less, and therefore the cost effectiveness is higher.

In endovascular interventional procedures, the surgery is carried out through a puncture on the surface of the patient's body. The surgery of the region of the vascular disease is achieved by a flexible tube called catheter, which is introduced through the puncture into an artery or into a vein. The catheter is then moved to the region where the vascular disease is present. The movement of the catheter to the intended position is done with the help of a "guide wire". During the surgery, the surgeon is not able to directly view the instruments since the entire procedure is carried out within the body. One of the most common methods of dynamically tracking the guide wire and the catheter inside the body is X-ray fluoroscopy. In this procedure, a contrast agent is introduced in the in the patient's body either through injection or through ingestion. The role of the contrast agent is to block the passage of X-rays and thus help in visualization of that part of the body where the contrast agent is located.

In a typical endovascular interventional procedure performed under X-ray fluoroscopy, it is critical that the surgical instruments like the catheter and the guide wire are accurately positioned at their intended location. The accurate positioning of the surgical instruments requires the surgeon to have a very accurate tracking of the catheter and the guide wire. For accurate tracking of the surgical instruments, high quality X-ray fluoroscopy images of the location of the catheter and the guide wire are needed.

Typically, the X-ray fluoroscopy images are of low quality and this is due to several factors. One is the low strength of the X-rays used; the strength of the X-rays is kept low to minimize the harmful effects of the X-rays. And, this is done as the duration of exposure to X-rays in an X-ray fluoroscopy procedure is very long. Another factor that affects the quality of the X-ray images is the motion of the catheter and the guide wire. This motion is caused because the X-ray reading device has to continuously adjust its position in order to follow the movement of the catheter and the guide wire. Due to the above mentioned factors, the surgeon might not be able to see the surgical instruments in all the low quality X-ray images.

As described above, there is a need for accurate tracking of the catheter and the guide wire in an X-ray fluoroscopy procedure. Improving the quality of the X-ray fluoroscopy images will lead to a significant improvement in the ease with which the surgeon is able to track various surgical instruments. The quality of an image can be improved by processing the image to increase the signal to noise ratio of the image. Thus, there is a need for improving the signal-to-noise ratio of an image during image processing.

BRIEF SUMMARY OF THE INVENTION

In accordance with one aspect, the present invention provides a method that comprises the steps of generating two lists of pixels (from pixels of an input image) based on two predefined scale space values. Thereafter, these two lists of pixels are processed to obtain an output image.

In accordance with another aspect, the present invention provides a system, which comprises an image source, an image smoothening module, a processor, a database and an image displaying unit. The image source generates an input image. The image smoothening module smoothens this input image. Subsequently, the processor processes the pixels of this smoothened input image to obtain two lists of pixels based on two predefined scale space values. These two pixel lists are stored in the database. Thereafter, the processor processes the two pixel lists to obtain an output image. Finally, the output image is displayed by the image displaying unit.

In accordance with another aspect, the present invention provides a computer program product embodied on a computer readable means for generating two lists of pixels (from the pixels of an input image) based upon two predefined scale space values, and further processing these two lists of pixels to obtain an output image.

BRIEF DESCRIPTION OF SEVERAL VIEWS OF THE DRAWINGS

Various embodiments of the present invention will hereinafter be described in conjunction with the appended drawings provided to illustrate and not to limit the present invention, wherein like designations denote like elements, and in which:

FIG. 3A depicts an example of an X-ray fluoroscopy image;

FIG. 3B depicts an example of a coarse scale space image obtained from the input X-ray fluoroscopy image shown in FIG. 3A;

FIG. 3C depicts an example of a fine scale space image obtained from the input X-ray fluoroscopy image shown in FIG. 3A; and FIG. 3D depicts an example of an output image with improved quality obtained from the input X-ray fluoroscopy image shown in FIG. 3A.

DETAILED DESCRIPTION OF THE INVENTION

The present invention relates to a method, system and computer program product to improve quality of images.

Hereinafter, aspects in accordance with various embodiments of the present invention will be described. As used herein, any term in the singular may be interpreted to be in the plural, and alternatively, any term in the plural may be interpreted to be in the singular.

The foregoing description of various products, methods, or apparatus and their attendant disadvantages described in the "Background of the invention" is in no way intended to limit the scope of the present invention, or to imply that the present invention does not include some or all of the elements of known products, methods, and/or apparatus in one form or another. Indeed, various embodiments of the present invention may be capable of overcoming some of the disadvantages noted in the "Background of the invention", while still retaining some or all of the various elements of known products, methods, and apparatus in one form or another. The method and system of the present invention are directed to the above stated problems, as well as other problems, that are present in conventional techniques.

In one embodiment, the present invention is envisioned to be operating in conjunction with X-ray fluoroscopy used for an endovascular interventional procedure. An endovascular interventional procedure is a surgical procedure used for treating vascular diseases. An endovascular procedure is carried out with the help of a flexible tube called a catheter, which is introduced in a patient's vein or artery and subsequently moved to the desired location. A guide wire is used along with the catheter to move the catheter to the intended location. The catheter and the guide wire are not directly visible to the surgeon as they are inside the body. One of the methods to track the movement of the catheter and the guide wire inside the body is X-ray fluoroscopy. In X-ray fluoroscopy, the catheter and the guide wire are tracked continuously by observing their positions on X-ray images of the body of the patient. It may be noted, though, that the present invention may be adapted to operate independently of X-ray fluoroscopy by one skilled in the art.

Figure 1A:
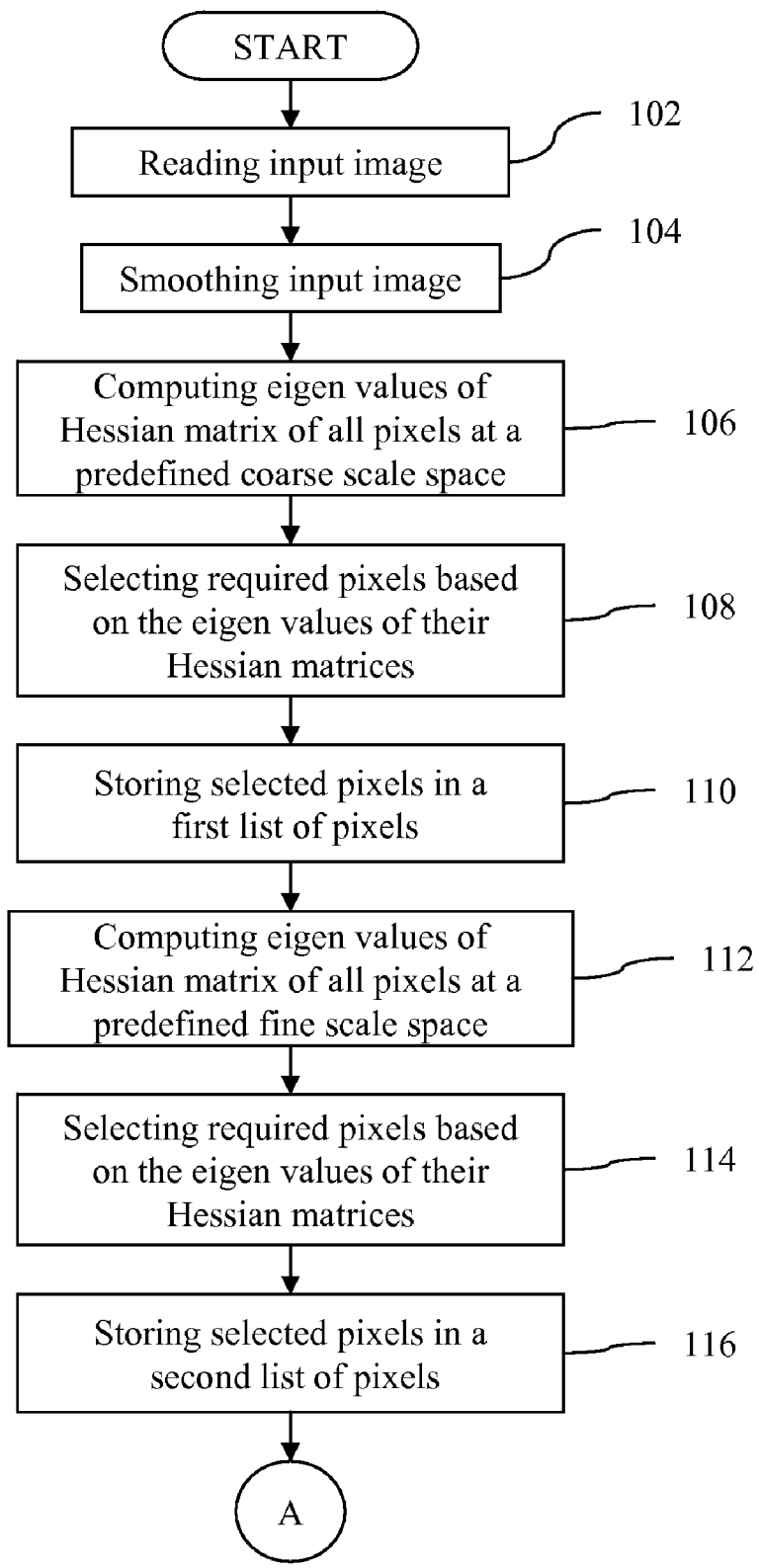
FIGS. 1A and 1B illustrate a flowchart depicting the steps involved in the present invention to improve quality of images, in accordance with one embodiment of the present invention.
Figure 1B:
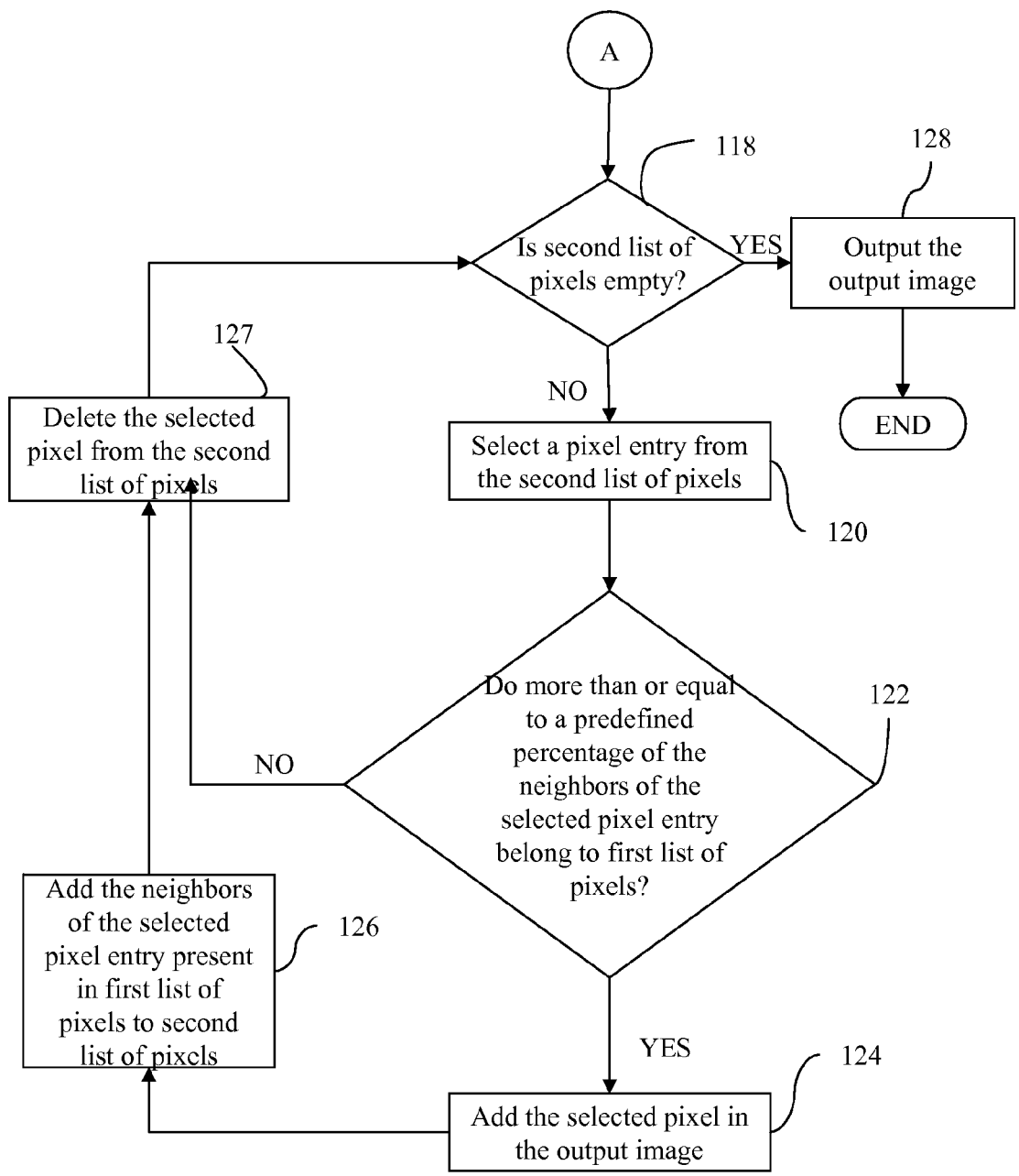

FIGS. 1A and 1B illustrate a flowchart depicting the steps involved in the present invention to improve quality of images.

At step 102, an image is inputted. An example of an input image is the X-ray fluoroscopy image shown in FIG. 3A.

At step 104, the input image is smoothened. This is done to reduce the noise of the input image. Noise in an image is unwanted background electrical data that reduces the quality of images. One way of smoothing the input image is by the use of a diffusion filter. Diffusion filters smoothen an image by reducing the effect of non-Gaussian additive noise. Typical examples of diffusion filters include linear diffusion filters, isotropic nonlinear diffusion filters and anisotropic nonlinear diffusion filters. It would be evident to one skilled in the art that there are many other ways of smoothing the input image.

At step 106, the smoothened input image obtained at step 104 is processed at a predefined coarse scale space. This is done by computing Hessian matrix for each of the pixels of the smoothened input image at a predefined low value of standard deviation (a). Hessian matrix for a two variable function f is defined as a two by two matrix $$\begin{vmatrix} [0026] \ f_{xx} & [0027] \ f_{xy} \\ [0028] \ f_{yx} & [0029] \ f_{yy} \end{vmatrix}$$

where $f_{ij}$ is the second order partial derivative of the function f $$\frac{\partial f}{\partial i \partial j}$$

The function f is a function of σ. In one embodiment, the low a value is user defined. The two eigen values of each of the Hessian matrices are then computed.

At step 108, a selection of pixels is made from the pixels of the input image to create a coarse scale space image of the input image. In one embodiment, this selection is based on the eigen values of the Hessian matrix of each of the pixels of the smoothened input image, which are calculated at step 106. This selection is done by comparing the absolute values of the two eigen values of a pixel. The eigen value with the greater absolute value is selected. If the selected eigen value is positive, the pixel is included in the coarse scale space image.

FIG. 3B illustrates an example of a coarse scale space image obtained from the input X-ray fluoroscopy image shown in FIG. 3A. In this example, the standard deviation used for the calculation of the Hessian matrix of each of the pixels is 0.28.

At step 110, the pixels selected at step 108 are stored in a list called first list of pixels.

At step 112, the smoothened input image obtained at step 104 is processed at a predefined fine scale space. This is done by computing the Hessian matrix for all pixels of the smoothened input image at a predefined high σ value. In one embodiment, the high σ value is user defined. The eigen values of each of the Hessian matrices are then calculated.

At step 114, a selection of pixels is made from the pixels of the input image to create a fine scale space image of the input image. This selection is based on the eigen values of the Hessian matrix of each of the pixels of the smoothened input image, which are calculated at step 112. The selection is done by comparing the absolute values of the two eigen values of a pixel. The eigen value with the greater absolute value is selected. If the selected eigen value is positive, the pixel is included in the fine scale space image.

FIG. 3C illustrates an example of a fine scale space image obtained from the input X-ray fluoroscopy image shown in FIG. 3A. In this example, the standard deviation used for the calculation of the Hessian matrix of each of the pixels is 0.35.

At step 116, the pixels selected at step 114 are stored in a list called second list of pixels.

At step 118, a check is made to determine whether the second list of pixels is empty. In case the second list of pixels is not empty then, at step 120, a pixel is selected from the second list of pixels.

At step 122, if less than a predefined percentage of the neighbors of the selected pixel belong to the first list of pixels, step 127 is executed. Otherwise, step 124 is executed.

At step 124, the selected pixel is added to an output image. Subsequently, step 126 is executed.

At step 126, the neighbors of the selected pixel that belong to the first list of pixels are added to the second list of pixels. Subsequently step 127 is executed.

At step 127, the selected pixel is deleted from the second list of pixels. Subsequently, step 118 is executed.

Referring back to step 118, if at step 118 it is found that the second list of pixels is empty, the output image is outputted.

FIG. 3D illustrates an example of an output image with improved quality obtained from the input X-ray fluoroscopy image shown in FIG. 3A.

The quality of a medical image is measured in terms of various parameters such as spatial distortion of various anatomical structures in the image, degree of blurring of the image, contrast between various elements of the image, signal to noise ratio of the image and presence of various artifacts in the image. In one embodiment, the present invention is envisioned to improve the signal to noise ratio of images. The signal to noise ratio of an input image is improved by generating two images of the input image at two predefined scale space values. Thereafter, the two scale space images are combined to obtain an image with an improved signal to noise ratio.

Figure 2:
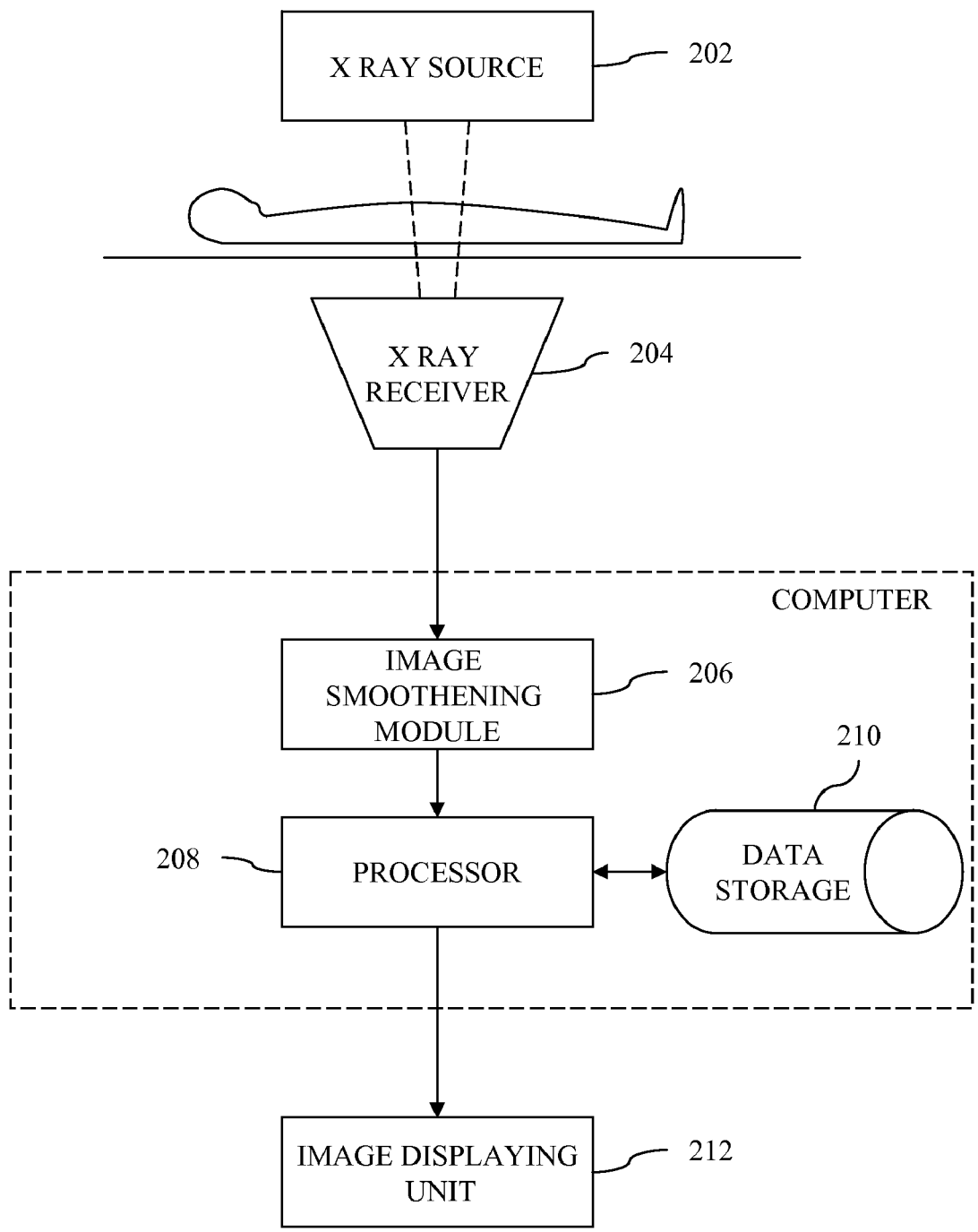
FIG. 2 is a block diagram showing the general working environment of one embodiment of the system for improving quality of images.

FIG. 2 is a block diagram showing the general working environment of one embodiment of the system for improving quality of images. In this embodiment, the present invention is shown to operate in conjunction with X-ray fluoroscopy. An X-ray source 202 is used to produce X-rays. The X-rays pass through the body of the patient and are received by an X-ray receiver 204. X-ray receiver 204 converts the X-rays incident on it to an X-ray image.

The X-ray image is transmitted to an image smoothening module 206 in the form of electrical signals. Image smoothening module 206 smoothens the input X-ray image. The smoothened input X-ray image is sent to a processor 208. Typical examples of a processor include a general purpose computer, a programmed microprocessor, a micro-controller, a peripheral integrated circuit element, and other devices or arrangements of devices, which are capable of carrying out the computation. Processor 208 reads the input image at two different predefined scale space values and generates two images of the smoothened input image at the two predefined scale space values. The two images are stored in a database 210. Thereafter, processor 208 processes the two images to obtain an output image having improved quality as compared to the input image. The output image is displayed on an image displaying unit 212. Typical example of an image displaying unit include liquid crystal displays (LCDs), cathode ray tubes (CRTs), light-emitting diode (LED) displays, television screens, etc.

It will be apparent to a person skilled in the art that the present invention also finds applications in other areas like other forms of medical imaging and in object recognition.

The system, as described in the present invention or any of its components may be embodied in the form of a processing machine. Typical examples of a processing machine include a general purpose computer, a programmed microprocessor, a micro-controller, a peripheral integrated circuit element, and other devices or arrangements of devices, which are capable of implementing the steps that constitute the method of the present invention.

The processing machine executes a set of instructions that are stored in one or more storage elements, in order to process input data. The storage elements may also hold data or other information as desired. The storage element may be in the form of a database or a physical memory element present in the processing machine.

The set of instructions may include various instructions that instruct the processing machine to perform specific tasks such as the steps that constitute the method of the present invention. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

A person skilled in the art can appreciate that it is not necessary that the various processing machines and/or storage elements be physically located in the same geographical location. The processing machines and/or storage elements may be located in geographically distinct locations and connected to each other to enable communication. Various communication technologies may be used to enable communication between the processing machines and/or storage elements. Such technologies include connection of the processing machines and/or storage elements, in the form of a network. The network can be an intranet, an extranet, the Internet or any client server models that enable communication. Such communication technologies may use various protocols such as TCP/IP, UDP, ATM or OSI.

In the system and method of the present invention, a variety of "user interfaces" may be utilized to allow a user to interface with the processing machine or machines that are used to implement the present invention. The processing machine uses the user interface to convey information to or receive information from a user. The user interface could be any hardware, software, or a combination of hardware and software used by the processing machine that allows a user to interact with the processing machine. The user interface may be in the form of a dialogue screen and may include various associated devices to enable communication between a user and a processing machine. It is contemplated that the user interface might interact with another processing machine rather than a human user. Further, it is also contemplated that the user interface may interact partially with other processing machines while also interacting partially with the human user.

While the various embodiments of the present invention have been illustrated and described, it will be clear that the present invention is not limited to these embodiments only. Numerous modifications, changes, variations, substitutions and equivalents will be apparent to those skilled in the art without departing from the spirit and scope of the invention as described in the claims.

The invention claimed is:

1. A method for image processing, the method including:
   receiving an input image;
   determining a coarse scale space image by processing the input image, wherein the coarse scale space image is determined based at least in part on a Hessian analysis with a low standard deviation;
   determining a fine scale space image by processing the input image, wherein the fine scale space image is determined based at least in part on a Hessian analysis with a high standard deviation;
   combining the coarse scale space image and the fine scale space image to generate an output image, wherein the output image is generated based at least in part on whether, for a pixel selected from the fine scale space image, a percentage of neighbors of the selected pixel present in the coarse scale space image is more than or equal to a predefined percentage.

2. The method claim of claim 1, further including smoothing the input image.

3. The method of claim 2, wherein the input image is smoothed prior to the determining a coarse scale space image step and the determining a fine scale space image step.

4. The method of claim 2, wherein smoothing the input image includes using a diffusion filter.

5. The method of claim 2, wherein smoothing the input image includes using a linear diffUsion filter.

6. The method of claim 2, wherein smoothing the input image includes using an isotropic nonlinear diffusion filter.

7. The method of claim 2, wherein smoothing the input image includes using an anisotropic nonlinear diffusion filter.

8. The method of claim 1, wherein the low standard deviation is about 0.28.

9. The method of claim 1, wherein the high standard deviation is about 0.35.

10. The method of claim 1, wherein the coarse scale space image is determined by determining two eigen values for the Hessian matrix of each pixel in the input image using the low standard deviation and selecting the eigen value with the greater absolute value if it is positive.

11. The method of claim 1, wherein the fine scale space image is determined by determining two eigen values for the Hessian matrix of each pixel in the input image using the high standard deviation and selecting the eigen value with the greater absolute value if it is positive.

12. The method of claim 1, wherein the input image is an x-ray image.

13. A system for image processing, the system including:
an image processor adapted to receive an input image, wherein the image processor is further adapted to determine a coarse scale space image based on the input image and a fine scale space image based on the input image and to combine the coarse scale space image and the fine scale space image to generate an output image, wherein the coarse scale space image is determined based at least in part on a Hessian analysis with a low standard deviation and the fine scale space image is determined based at least in part on a Hessian analysis with a high standard deviation, wherein the output image is generated based at least in part on whether, for a pixel selected from the fine scale space image, a percentage of neighbors of the selected pixel present in the coarse scale space image is more than or euual to a predefined percentage; and
a display adapted to display the output image.

14. The system claim of claim 13, further including a smoothing module adapted to smooth the input image.

15. The system of claim 13, wherein the coarse scale space image is determined by determining two eigen values for the Hessian matrix of each pixel in the input image using the low standard deviation and selecting the eigen value with the greater absolute value if it is positive.

16. The system of claim 13, wherein the fine scale space image is determined by determining two eigen values for the Hessian matrix of each pixel in the input image using the high standard deviation and selecting the eigen value with the greater absolute value if it is positive.

17. A computer-readable medium including a set of instructions for execution on a computer, the set of instructions including:
an image receiving routine configured to receive an input image;
a coarse scale space image determination routine configured to determine a coarse scale space image by processing the input image, wherein the coarse scale space image is determined based at least in part on a Hessian analysis with a low standard deviation;
a fine scale space image determination routine configured to determining a fine scale space image by processing the input image, wherein the fine scale space image is determined based at least in part on a Hessian analysis with a high standard deviation;
a combining routine configured to combine the coarse scale space image and the fine scale space image to generate an output image, wherein the output image is generated based at least in part on whether, for a pixel selected from the fine scale space image, a percentage of neighbors of the selected pixel present in the coarse scale space image is more than or equal to a predefined percentage.

18. A method for image processing, the method including:
receiving an input image;
determining a coarse scale space image by processing the input image, wherein the coarse scale space image is determined based at least in part on a Hessian analysis with a low standard deviation;
determining a fine scale space image by processing the input image, wherein the fine scale space image is determined based at least in part on a Hessian analysis with a high standard deviation;
combining the coarse scale space image and the fine scale space image to generate an output image, wherein the combining step includes storing pixels of the coarse scale space image in a first list of pixels and storing the pixels of the fine scale space image in a second list of pixels, and generating the output image by:
 (a) selecting a pixel from the second list of pixels;
 (b) if the percentage of selected pixel's neighbors present in the first list of pixels is more than or equal to a predefined percentage, then adding the selected pixel to the output image and adding the neighbors of the selected pixel from the first list of pixels to the second list of pixels;
 (c) deleting the selected pixel from the second list of pixels; and
 (d) repeating steps (a) to (c) until the second list of pixels is empty.

19. A system for image processing, the system including:
an image processor adapted to receive an input image, wherein the image processor is further adapted to determine a coarse scale space image based on the input image and a fine scale space image based on the input image and to combine the coarse scale space image and the fine scale space image to generate an output image, wherein the coarse scale space image is determined based at least in part on a Hessian analysis with a low standard deviation and the fine scale space image is determined based at least in part on a Hessian analysis with a high standard deviation; and
a display adapted to display the output image, wherein the image processor is adapted to combine the coarse scale space image and the fine scale space image by storing pixels of the coarse scale space image in a first list of pixels and storing the pixels of the fine scale space image in a second list of pixels, and generating the output image by:
 (a) selecting a pixel from the second list of pixels;
 (b) if the percentage of selected pixel's neighbors present in the first list of pixels is more than or equal to a predefined percentage, then adding the selected pixel to the output image and adding the neighbors of the selected pixel from the first list of pixels to the second list of pixels;
 (c) deleting the selected pixel from the second list of pixels; and
 (d) repeating steps (a) to (c) until the second list of pixels is empty.

20. A computer-readable medium including a set of instructions for execution on a computer, the set of instructions including:

an image receiving routine configured to receive an input image;

a coarse scale space image determination routine configured to determine a coarse scale space image by processing the input image, wherein the coarse scale space image is determined based at least in part on a Hessian analysis with a low standard deviation;

a fine scale space image determination routine configured to determining a fine scale space image by processing the input image, wherein the fine scale space image is determined based at least in part on a Hessian analysis with a high standard deviation;

a combining routine configured to combine the coarse scale space image and the fine scale space image to generate an output image, wherein combining routine is configured to combine the coarse scale space image and the fine scale space image by storing pixels of the coarse scale space image in a first list of pixels and storing the pixels of the fine scale space image in a second list of pixels, and to generate the output image by:

(a) selecting a pixel from the second list of pixels;

(b) if the percentage of selected pixel's neighbors present in the first list of pixels is more than or equal to a predefined percentage, then adding the selected pixel to the output image and adding the neighbors of the selected pixel from the first list of pixels to the second list of pixels;

(c) deleting the selected pixel from the second list of pixels; and (d) repeating steps (a) to (c) until the second list of pixels is empty.

* * * * *

UNITED STATES PATENT AND TRADEMARK OFFICE
CERTIFICATE OF CORRECTION

PATENT NO. : 7,418,151 B2  Page 1 of 1
APPLICATION NO. : 11/774384
DATED : August 26, 2008
INVENTOR(S) : Ghosh et al.

It is certified that error appears in the above-identified patent and that said Letters Patent is hereby corrected as shown below:

At col. 6, claim 5, line 67, delete "diffUsion" and insert --diffusion--.

Signed and Sealed this

Twentieth Day of January, 2009

JON W. DUDAS
*Director of the United States Patent and Trademark Office*